United States Patent [19]

Kamei

[11] Patent Number: 5,608,811
[45] Date of Patent: Mar. 4, 1997

[54] METHOD OF SMOOTHING A RIDGE DIRECTION PATTERN AND AN EQUIPMENT USED THEREFOR

[75] Inventor: Toshio Kamei, Tokyo, Japan

[73] Assignee: NEC Corporation, Tokyo, Japan

[21] Appl. No.: 1,676

[22] Filed: Jan. 7, 1993

[30]  Foreign Application Priority Data

Jan. 7, 1992 [JP] Japan .................................. 4-018589

[51] Int. Cl.$^6$ ...................................................... G06K 9/00
[52] U.S. Cl. ........................................... 382/124; 382/254
[58] Field of Search ................................. 382/2, 4, 21, 5, 382/41, 54; 356/71

[56] References Cited

U.S. PATENT DOCUMENTS

| | | | |
|---|---|---|---|
| 4,817,183 | 3/1989 | Sparrow | 382/5 |
| 5,140,642 | 8/1992 | Hsu et al. | 382/5 |

*Primary Examiner*—Leo Boudreau
*Assistant Examiner*—D. Richard Anderson, Jr.
*Attorney, Agent, or Firm*—Sughrue, Mion, Zinn, Macpeak & Seas

[57] ABSTRACT

An energy function is defined as a linear sum of a discrepancy evaluation function and a dispersion evaluation function. Direction variables of all the subregions of a ridge direction pattern are variables of both evaluation functions. Direction variables are successively renovated along a line on which the energy function becomes minimum for a change of a concerned variable keeping all other variables unchanged. Reliabilities of initial directions in all the subregions are included as coefficients in the discrepancy evaluation function, and a higher reliability of an initial direction constrains the directional difference between the initial direction and the corresponding direction variable in a smaller amount. A set of variables which makes the energy function minimum is taken as a set of smoothed ridge direction pattern.

6 Claims, 6 Drawing Sheets

FIG. 5A
 
SOLID LINE
(INITIAL PATTERN)
SMOOTHED
PATTERN
DOT LINE
(VARIABLE PATTERN)
FIG. 5B
 
SOLID LINE
(INITIAL PATTERN)
SMOOTHED
PATTERN
FIG. 6
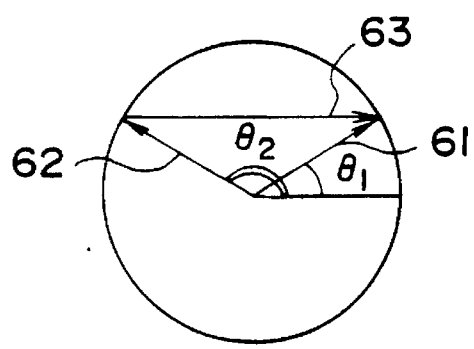

METHOD OF SMOOTHING A RIDGE DIRECTION PATTERN AND AN EQUIPMENT USED THEREFOR

BACKGROUND OF THE INVENTION

This invention relates to a method of recognizing fingerprints, and more particularly to a method of smoothing a ridge direction pattern when the flow of the ridge lines is used for precise interpretation of fingerprints.

A method of smoothing a ridge direction pattern has been disclosed, for example, on "Fingerprint Pattern Classification" by Masahiro Kawagoe et al in Pattern Recognition Vol. 17, No. 3, pp. 295–303, 1984, on "A Restoration Algorithm of Fingerprint Images"by Osamu Nakamura et al in Treatise of Japanese Electronics and Communication Vol. J68, No. 5, pp 1133–1140, 1985, and on "Automated Fingerprint Identification by Minutia-Network Feature" by Ko Asai et al in Treatise of Japanese Electronics, Information and Communication Vol. J72-D-II, pp724–732, 1989.

In these heretofore known systems, a fingerprint is input, for example, as a 512×512 binary image(dot matrix) and converted into an array of direction patterns composed of 32×32 subregions, each corresponding to a 16×16 pixel area.

The direction in each subregion is quantized in eight different levels, that is, 0, $\pi/8$, $2\pi/8$, $3\pi/8$, $4\pi/8$, $5\pi/8$, $6\pi/8$, $7\pi/8$ and is labeled by d from d=1 to d=8, d=1 corresponding to 0 level and d=7 corresponding to $7\pi/8$ level. In addition to these eight levels, d=0 is labeled to a subregion where no ridge line is contained or where the direction pattern is not defined.

In the conversion into these nine labels, a quantized direction having the highest probability in a subregion is labeled to the subregion, and its probability is called an initial probability of the initial direction.

Then, the probabilities of the directions of all the subregions are repeatedly innovated by probability relaxation process in which a renovated probability is expressed by $$P_j^{k+1}(d) = \frac{P_j^k(d)\{1 + q_j^k(d)\}}{\Sigma P_j^k(d)\{1 + q_j^k(d)\}} \quad (1)$$

where $$q_j^k(d) = \sum_{j'=1}^{a} W_{jj'} \cdot \left\{ \sum_{d'=0}^{8} \gamma_{jj'}(d,d') P_{j'}^k(d) \right\}$$

$P_j^k(d)$ is the probability of direction d at position j in the kth iteration, j,(j') is the subregions position, a is the extent of the subregions having influence on a subregion concerned, $W_{jj'}$ is a weight of influence from a subregion at point j' to a subregion at point j, $\gamma_{jj'}(d,d')$ is the compatibility coefficient, for example =1 when d is parallel to d', and =−1 when d is perpendicular to d'.

At each iteration of the probability relaxation process, the direction having the highest probability in a subregion may change and the label of the subregion is changed.

After a certain number of iterations of the process, the label determined by the final iteration is taken as a smoothed label of the subregion.

Although the initial probability of a label for each subregion is determined at the initial conversion of the fingerprint, the label of a subregion can be changed at each iteration of the relaxation process without a constraint from the initial probability. Thus, there is no guarantee of convergence of a direction of a subregion, and an iteration of the step does not necessarily improve the smoothness of the ridge line pattern. Therefore, the operator must decide the termination of iteration by trial and error, observing the results on the way, and it is difficult to obtain a reliable ridge line pattern by this relaxation process.

And in this relaxation process, a label of low probability(poor reliability) is treated equally as a label of high probability(good reliability). As a result, a label having a high initial probability can be changed to a wrong direction by an influence from a label having a low probability.

SUMMARY OF THE INVENTION

Therefore, an object of the present invention is to provide a process of smoothing in which an iteration of the process always improves the result of smoothing, Another object of this invention is to provide a process of smoothing in which the operator is informed of the proper termination of the iteration.

And still another object of this invention is to provide a process of smoothing in which a label having a higher initial probability is less changed than that having a lower initial probability.

In order to achieve these objects, a discrepancy evaluation function $E_1$ and a dispersion evaluation function $E_2$ are introduced in this invention.

A direction variable which is represented by $\theta(m, n)$(where m, n indicate the position of the subregion) is assigned to each subregion, and all the direction variables of all the subregions compose the variables of these functions. A contribution from a subregion to the discrepancy evaluation function is defined as a sum of the product of the direction difference of the direction variable from the initial direction of the subregion and the reliability of the initial direction.

Thus $E_1$ is represented by $$E_1 = \sum\sum_{mn} R(m,n)\delta\{\Theta(m,n),\theta(m,n)\} \quad (2)$$

where $\Theta(m,n)$ is the initial direction of a subregion at mth row and nth column, $R(m,n)$ is the reliability of the initial direction represented by the initial probability of the initial direction, $\theta(m,n)$ is the direction variable of the subregion, and $\delta$ represents the direction difference for example defined in a later paragraph.

$$\sum\sum_{mn}$$

means a summation for all subregions.

A contribution from a subregion to the dispersion evaluation function $E_2$ is defined as a sum of the products of the direction difference from neighboring subregions and the weight of influence of the neighboring subregions. When the weight of the four neighboring subregions is 1(unity) and the weight of all the other subregions is 0(zero), $E_2$ is represented by $E_2=$ $$E_2 = \sum\sum_{mn}[\delta\{\theta(m,n),\theta(m+1,n)\} + \delta\{\theta(m,n),\theta(m,n+1)\}] \quad (3)$$

And an energy function E is defined by $$E = E_1 + \lambda E_2 \quad (4),$$

where $\lambda$ is a coefficient to be determined by design.

At one extreme, when $\lambda$ is sufficiently smaller than unity, E becomes close to a minimum value when $E_1$ is a minimum value ($E_1=0$) with the direction variable in each subregion being equal to the initial direction. And at the other extreme, when $\lambda$ is sufficiently larger than unity, E becomes close to a minimum when $E_2$ is a minimum value ($E_2=0$) with all the direction variable of all the subregions being the same value. Between these two extremes, there is a range of the values of $\lambda$ which gives an adequate ridge direction pattern smoothing. This range can be detected experimentally through trial and error. In experiments conducted by the inventor, a value of $\lambda=3.3$ was found to yield good results.

Thus, according to a first feature of this invention, the smoothed direction pattern of ridge lines is represented by a set of direction variables which makes the energy function E to a minimum value and comprises a step of extracting the initial pattern, a step of repeating renovation of direction variables and a step of calculating the value of the energy function for the renovated direction variables and judging the necessity of further iteration.

According to a second feature of this invention, the direction difference of two directions $\delta(\theta_2, \theta_1)$ is defined as a square of magnitude of a vector representing a difference vector between two unit vectors having directions $\theta_2$ and $\theta_1$ respectively.

According to a third feature of this invention, a new direction variable of a subregion is so determined as to satisfy equations $$\partial E/\partial\theta(m, n) = 0, \text{ and } \partial^2 E/\partial\theta(m,n)^2 > 0 \quad (5),$$

and then another new direction variable of another subregion is determined in a similar way.

In a fourth embodiment of this invention, an equipment used for smoothing a ridge direction pattern comprises a picture image memory, a ridge direction pattern extraction means, an initial pattern memory for storing an initial direction pattern, a reliability pattern memory for Storing an initial probability of the direction pattern, ridge direction pattern renovation means, and judgement means for deciding the necessity of further renovation.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

FIGS. 5 show an effect of this invention.

FIG. 6 illustrate a definition of a direction difference.

DETAILED DESCRIPTION OF THE PREFERRED EMBODIMENTS

Figure 1:
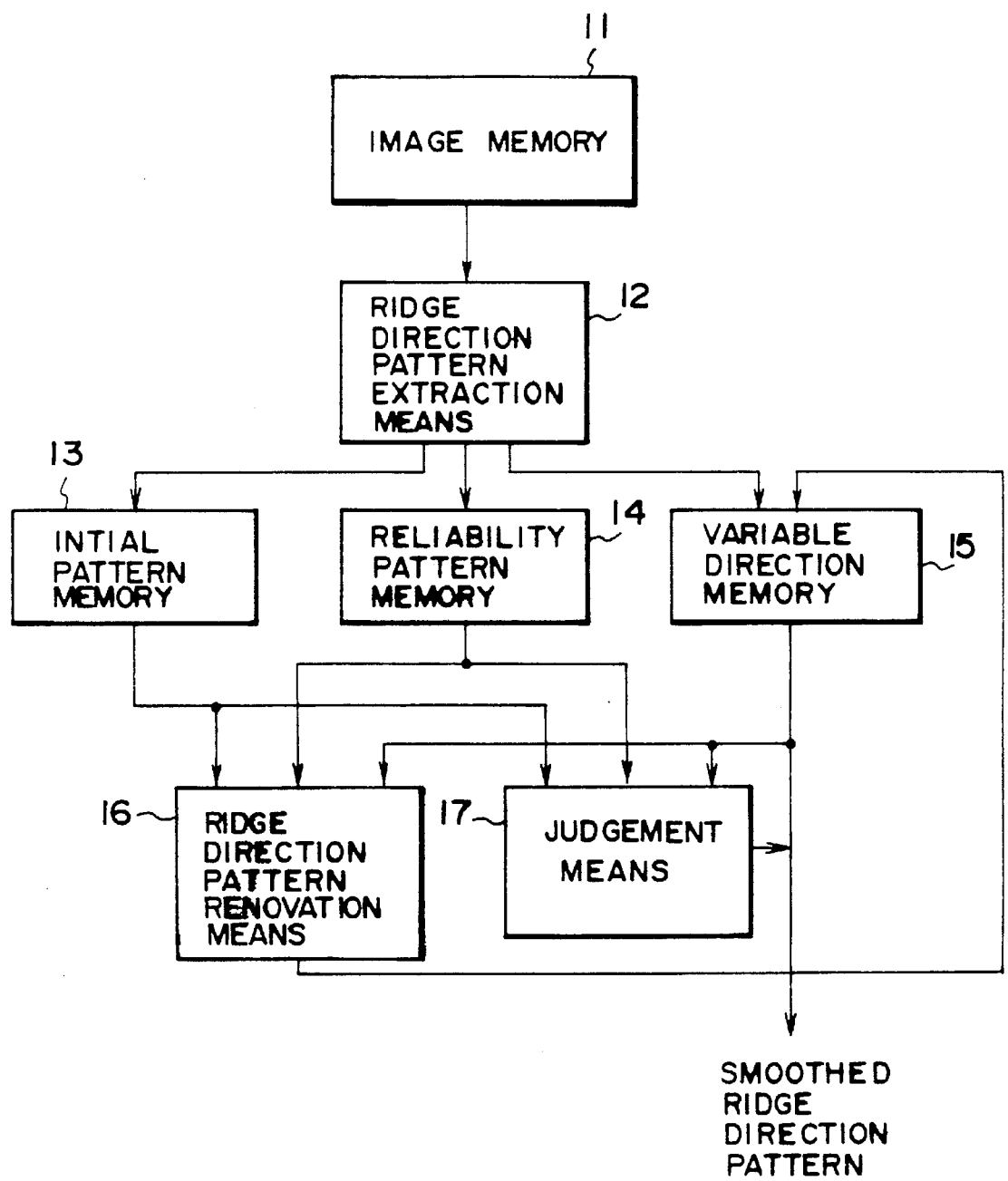
FIG. 1 shows a block diagram of an embodiment of this invention.

Referring to FIG. 1, an image memory 11 stores a fingerprint picture. This picture is input to the image memory 11 by a conventional image input device, such as an image scanner. Ridge direction pattern extraction means 12 selects a portion of the content of the image memory 11, for example, 512×512 image data and converts the selected image data into an array of direction patterns of, for example, 32×32 subregions. In this conversion, the reliability of each direction of a subregion is also determined.

Figure 3:
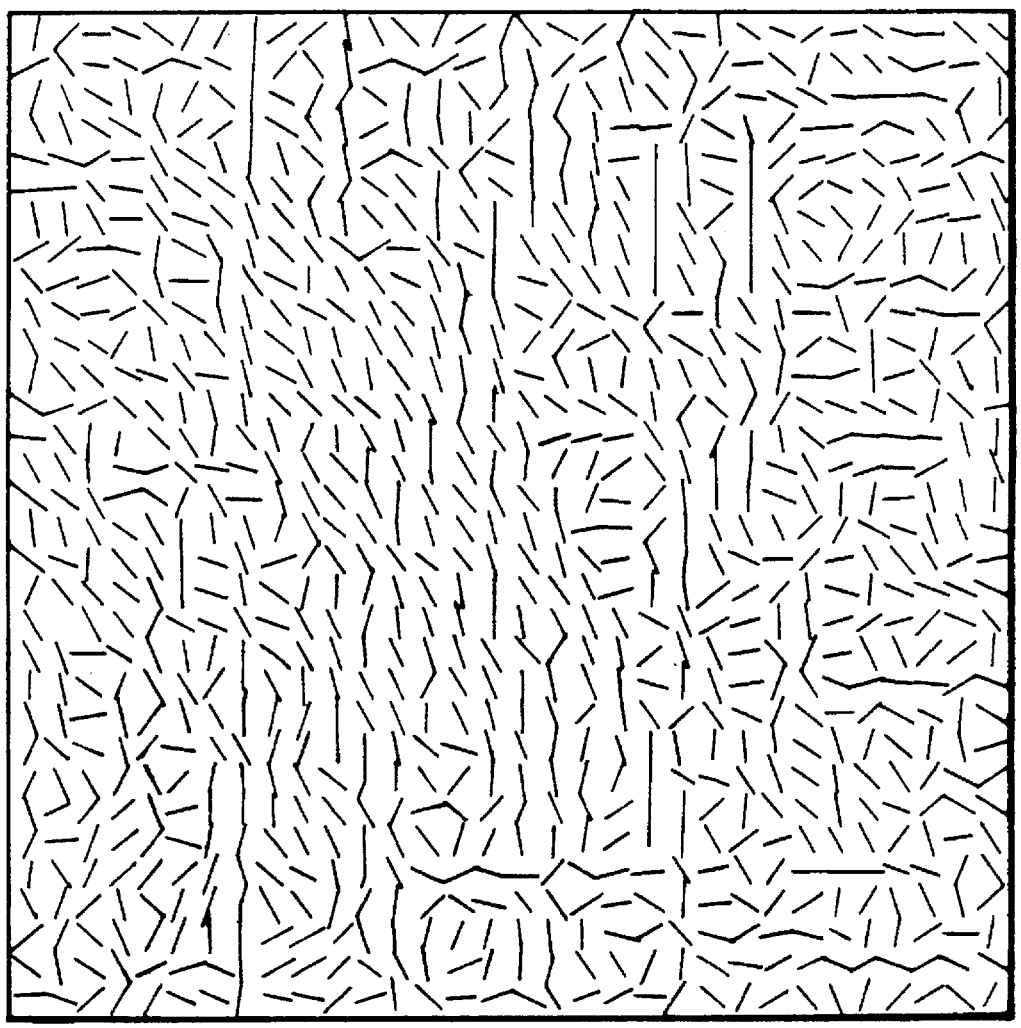
FIG. 3 shows an example of an initial ridge direction pattern of an embodiment of this invention.

The direction patterns are stored in an initial pattern memory 13, and the reliability corresponding to a direction pattern of a subregion is stored in a reliability pattern memory 14. A variable direction memory 15 stores an array of direction variables. Initial values of these direction variables may be the initial directions in the initial pattern memory 13. FIG. 3 shows an example of an initial ridge direction pattern stored in the initial pattern memory 13.

In ordinary circumstances, because of the difficulty to obtain an accurate and reliable fingerprint image in the image memory 11, the initial ridge direction pattern as shown in FIG. 3 is not sufficiently reliable and must be smoothed.

Figure 4:
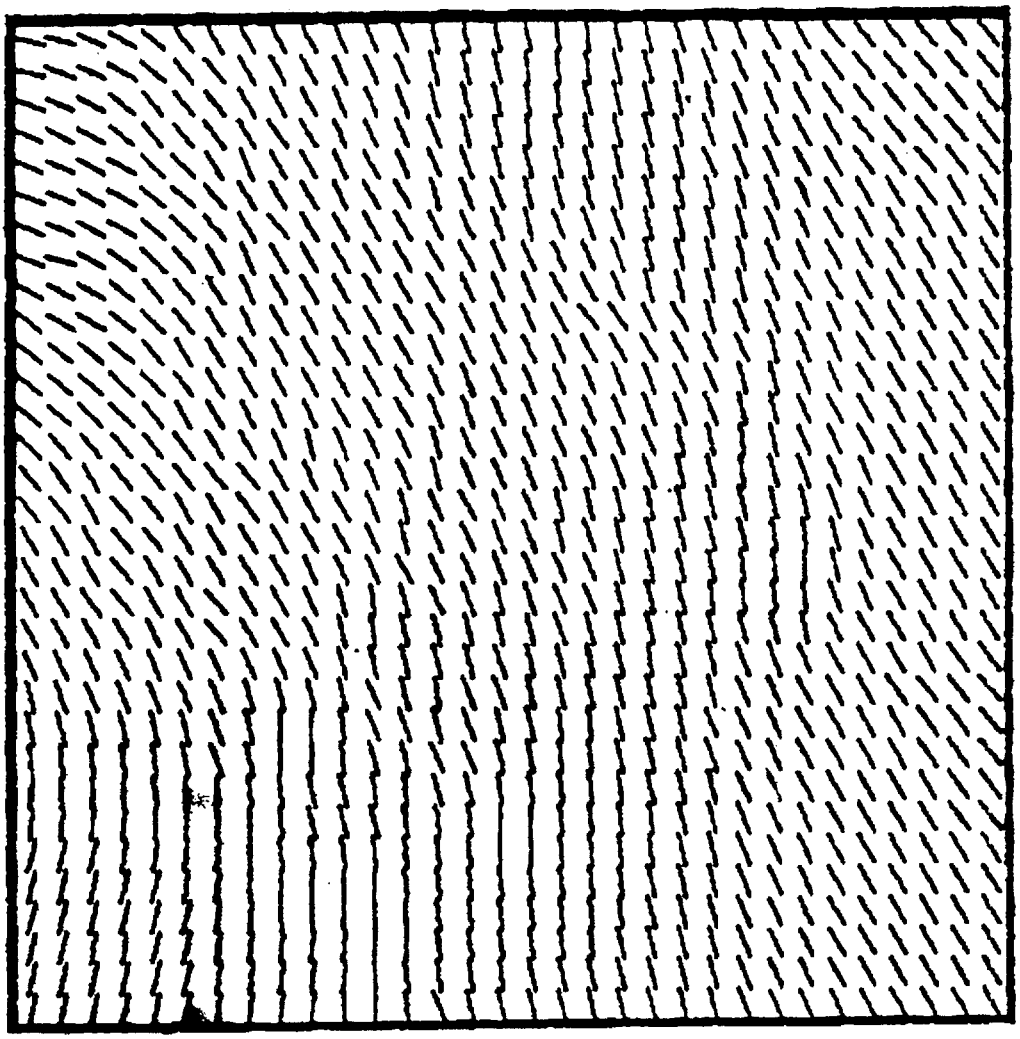
FIG. 4 shows a ridge direction pattern smoothed from FIG. 3.

In this invention, the smoothing of the ridge direction pattern is processed along a line on which the energy function E is decreased. Ridge direction pattern renovation means 16 changes direction variables in the variable direction memory 15, and judgement means 17 calculates the energy function E for the renovated variables, and when the decrement $\Delta E$ of the energy function is below a predetermined level, the renovation of direction variables is terminated and the contents of the variable direction memory 15 are taken out as a smoothed ridge direction pattern. FIG. 4 shows an example of a smoothed ridge direction pattern obtained from the original pattern shown by FIG. 3.

FIGS. 5 show an effect of $R(m,n)$ to a smoothing process of this invention. Three subregions $(m-1,n),(m,n),(m+1,n)$ are shown. In FIG. 5(a) and FIG. 5(b), it is assumed that an increase in $E_1$ is outweighed by a decrease in $E_2$, and the smoothed pattern as shown decreases the energy function E. In FIG. 5(b), it is assumed that $R(m-1,n) > R(m,n)$ and $R(m+1,n) > R(m,n)$, and small changes in directions of the subregions $(m-1,n)$ and $(m+1,n)$ with a large change in direction of the subregion $(m,n)$ made the increase in $E_1$ to a minimum. When this difference in reliability is not considered, the increase in $E_1$ will be minimum when the direction change is equal in these three subregions as shown by FIG. 5(a), in which a reliable initial direction of the subregions $(m-1,n)$ and $(m+1,n)$ are changed by an influence of a direction error of the subregion $(m,n)$.

In an embodiment of this invention, the direction difference $\delta(\theta_2,\theta_1)$ between two directions $\theta_2$ and $\theta_1$ is defined as a square of magnitude of a vector representing a difference vector between two unit vectors having directions $\theta_1$, $\theta_2$ respectively.

FIG. 6 illustrates this definition wherein a unit vector having direction $\theta_1$ is denoted by a numeral 61, and another unit vector having direction $\theta_2$ is denoted by a numeral 62. A numeral 63 represents a difference vector of the two unit vectors 61 and 62. A square of the magnitude of 63 is defined as the direction difference $\delta(\theta_2, \theta_1)$. Thus, the direction difference $\delta\{\theta(m,n), \Theta(m,n)\}$ in equation(2) is represented by $$|\exp(i\theta) - \exp(i\Theta)|^2 \quad (6),$$

where $\exp(i\theta)$ represents a unit vector having direction $\theta$. It must be noted that directions in equation (6) are to be measured in $0 \sim 2\pi$. When these directions are measured in a limited range of 0~π, the values of the direction angles must be doubled.

Figure 7:
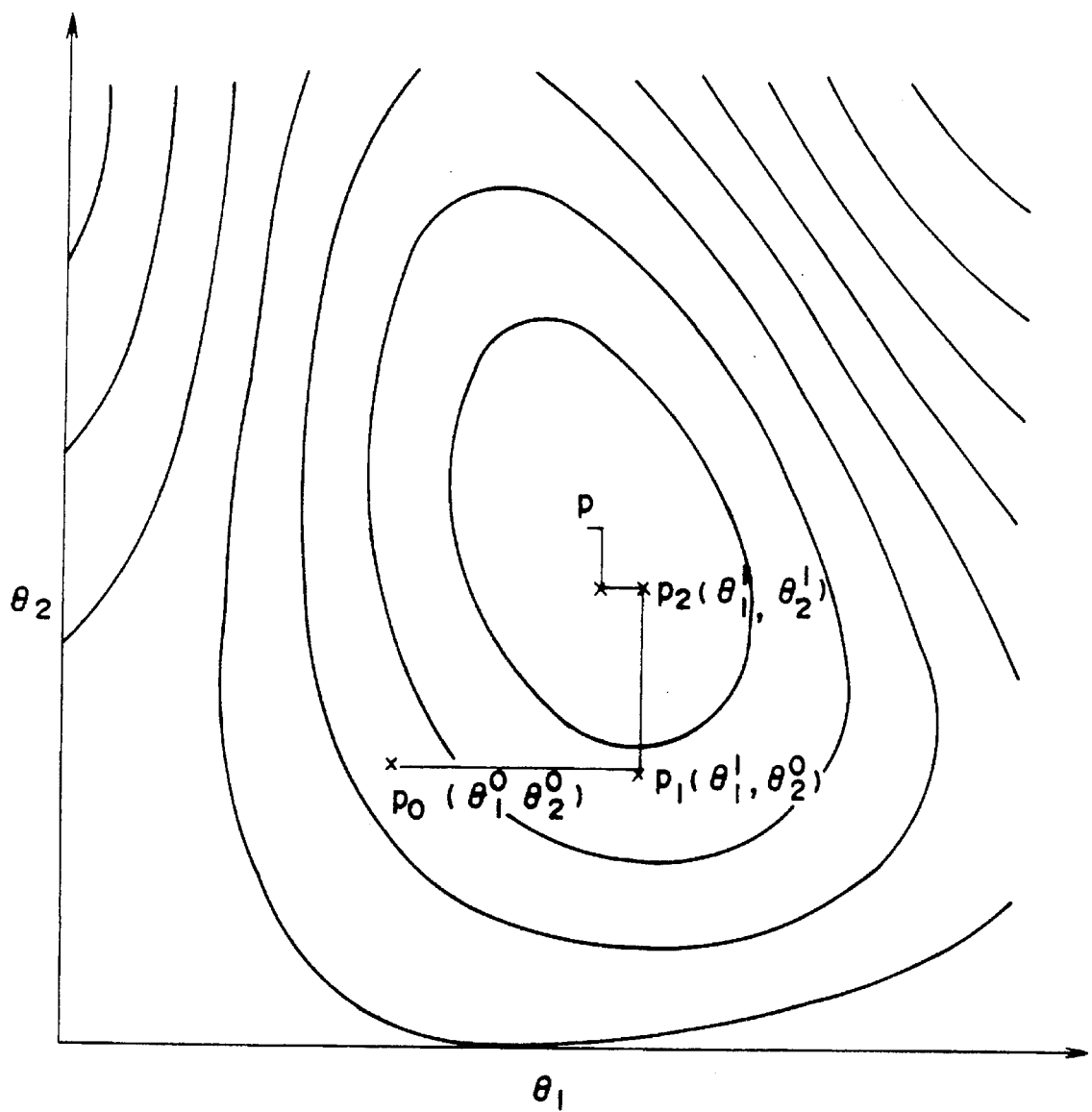
FIG. 7 shows a process of renovating direction variables.

In the ridge direction pattern renovation means 16, calculation by equations (5) is executed. FIG. 7 illustrates an example of renovating direction variables for two variables $\theta_1$ and $\theta_2$. Constant energy lines are plotted on a plane of the two variables $\theta_1$ and $\theta_2$. Starting from an initial condition represented by $p_0$, $\theta_1$ is changed in accordance with equations(5) to point $p_1$ keeping $\theta_2$ unchanged. From point $p_1$, $\theta_2$ is changed in accordance with equations(5) to point $p_2$ keeping $\theta_1$ unchanged. Repeating these steps, we can reach to a point p having a minimum energy value.

Actually, there are as many direction variables as the number of subregions, and the renovation of direction variables must be executed in a multi-dimensional space along an axis corresponding to each direction variable.

When the equations(5) are solved for equations(2),(3),(4) and (6), we obtain $\theta(m,n)=\arctan(A_y/A_x)$ where $\theta(m,n)$ satisfies $\cos\theta(m,n)=A_y/A$ and $$A_x \equiv R(m,n)\cos\Theta(m,n) + \lambda\{\cos\theta(m+1,n)+\cos\theta(m,n+1)+\cos\theta(m-1,n)+\cos\theta(m,n-1)\}$$

$$A_y \equiv R(m,n)\sin\Theta(m,n) + \lambda\{\sin\theta(m+1,n)+\sin\theta(m,n+1)+\sin\theta(m-1,n)+\sin\theta(m,n-1)\}$$

$$A \equiv (A_x^2 + A_y^2)^{1/2}$$

Figure 2:
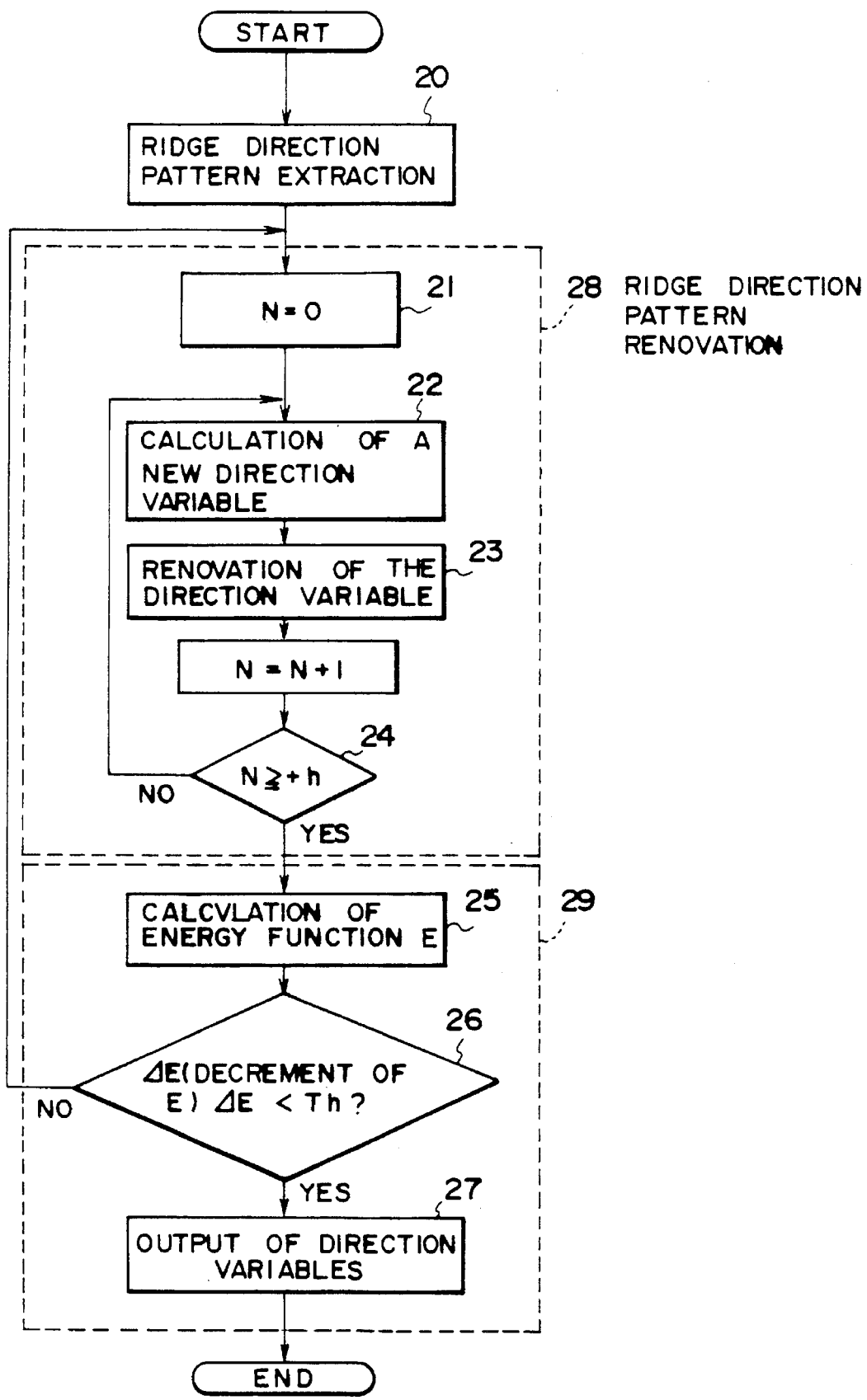
FIG. 2 shows a flow diagram of an embodiment of this invention.

Now referring to FIG. 2, a new value of a direction variable is calculated at step 22, and at step 23 the direction variable is renovated by the value calculated in step 22. These steps 22 and 23 are repeated for all the direction variables, and the energy function E is calculated at step 25. At a judgement step 26, the decrement ΔE of the energy function in the iteration is compared to a predetermined threshold level Th. When ΔE<Th, the iteration of steps 22, 23 and 24 is terminated, and the direction variables are output as a smoothed direction pattern. When ΔE≧Th, a ridge line pattern renovation step 28 including steps 22, 23 and 24 is repeated.

Although only preferred embodiments have been described on this invention, it must be understood that various modifications can be made without departing from the scope of this invention.

I claim:

1. Method of smoothing ridge direction pattern comprising:

a step of dividing a ridge line image picture, which represents a fingerprint, into an array of plural subregions, a step of determining an initial direction of ridge line image and an initial probability representing the reliability of said initial direction for each subregion, a step of determining an initial value of a direction variable for each subregion, a step of calculating, for each subregion, a plurality of respective products of the initial probability of said subregion multiplied by a direction difference which is the difference between the direction variable and the initial direction of said subregion, a step of determining said plurality of respective products of all the subregions for determining a discrepancy evaluation function, a step of calculating, for each concerned subregion, a product of a weight of influence from a neighboring subregion multiplied by the direction difference between the direction variables of said concerned and said neighboring subregion, a step of determining, for each said concerned subregion, said product of weight and the direction difference on all neighboring subregions for determining a component of a dispersion evaluation function of said concerned subregion, a step of determining said component of dispersion evaluation function on all the subregions for determining a dispersion evaluation function, a step of calculating an energy function E which is represented as a linear function of said discrepancy evaluation function and said dispersion function, and a step of renovating direction variables to decrease said energy function.

2. Method of smoothing a ridge direction pattern according to claim 1, wherein said direction difference $\delta(\theta_2,\theta_2)$ between two directions $\theta_2$ and $\theta_2$ is defined as a square of magnitude of a vector representing a difference vector between two unit vectors having directions $\theta_2$ and $\theta_2$ respectively.

3. Method of smoothing a ridge direction pattern according to claim 1, wherein said step of renovating said direction variables comprises:

calculation step for determining a new direction variable $\theta_2$ by equations $\partial E/\partial\theta_1=0$, and $\partial^2 E/\partial\theta_1^2>0$ where $\theta_1$ is the direction variable of an arbitrary subregion, renovation step for substituting said direction variable of said arbitrary subregion by said new direction variable, and steps of repeating said calculation steps and said renovation steps for all other subregions.

4. Method of smoothing a ridge direction pattern comprising:

a step of dividing a ridge line image picture, which represents a fingerprint, into an array of plural subregions, a step of determining an initial direction of ridge line image and an initial probability representing the reliability of said initial direction for each subregion, a step of determining an initial value of a direction variable for each subregion, ridge direction pattern renovating step in which a step of calculating a new direction value and a step of renovating the direction variable by the calculated value is repeated for all the subregions, a step of calculating an energy function E which is a linear function of said initial probability and the calculated value for renovated direction variables, and a judgement step for determining a number of iterations of said ridge direction pattern renovating step.

5. Method of smoothing a ridge direction pattern according to claim 4, wherein said judgement step comprises:

a step of calculating decrement of said energy function by said ridge direction pattern renovating step, and a step of comparing said calculated decrement to a predetermined threshold value.

6. An equipment used for smoothing a ridge direction pattern comprising:

an image memory for storing a fingerprint ridge line picture which represents a fingerprint, ridge direction pattern extraction means for converting the contents of said image memory to direction patterns of a plurality of subregions of said fingerprint ridge line picture and reliabilities of the direction patterns, an initial pattern memory for storing said direction patterns produced by said ridge direction pattern extraction means, a reliability pattern memory for storing said reliabilities of the direction patterns produced by said ridge direction pattern extraction means, variable direction memory for storing all the direction variables, ridge direction pattern renovation means for renovating the contents of said variable direction memory by a calculated value, and, judgement means including means of calculating an energy function E, which is a function of said reliabilities and said calculated value, and means for deciding the termination of renovation of the contents of said variable direction memory.

* * * * *

UNITED STATES PATENT AND TRADEMARK OFFICE
CERTIFICATE OF CORRECTION

PATENT NO. : 5,608,811
DATED : March 4, 1997
INVENTOR(S) : Toshio KAMEI

It is certified that error appears in the above-indentified patent and that said Letters Patent is hereby corrected as shown below:

Column 6, line 18, delete "$(\Theta_2, \Theta_2)$" and insert --$(\Theta_2, \Theta_1)$--.

Column 6, line 19, delete "$\Theta_2$ and $\Theta_2$" and insert --$\Theta_1$ and $\Theta_1$--.

Column 6, line 21, delete "$\Theta_2$ and $\Theta_2$" and insert --$\Theta_1$ and $\Theta_1$--.

Column 6, line 27, delete "$\Theta_2$" and insert --$\Theta_1$--.

Signed and Sealed this

Twenty-second Day of July, 1997

Attest:

BRUCE LEHMAN

*Attesting Officer*   *Commissioner of Patents and Trademarks*